B. J. WILSON.
Cotton and Hay Press.
No. 161,847.  Patented April 6, 1875.
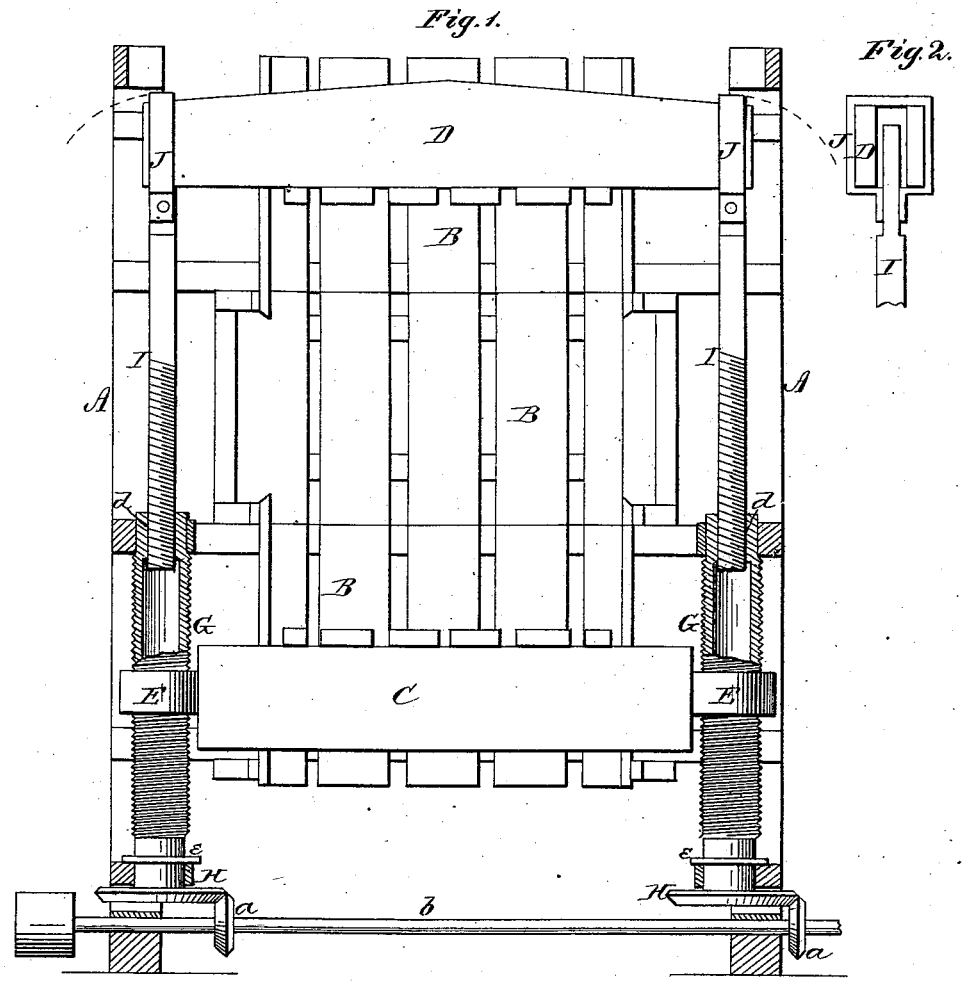

UNITED STATES PATENT OFFICE.

BENJAMIN J. WILSON, OF ATLANTA, GEORGIA.

IMPROVEMENT IN COTTON AND HAY PRESSES.

Specification forming part of Letters Patent No. 161,847, dated April 6, 1875; application filed March 6, 1875.

*To all whom it may concern:*

Be it known that I, BENJAMIN J. WILSON, of Atlanta, in the county of Fulton and in the State of Georgia, have invented certain new and useful Improvements in Cotton and Hay Presses; and do hereby declare that the following is a full, clear, and exact description thereof, reference being had to the accompanying drawings and to the letters of reference marked thereon, making a part of this specification.

The nature of my invention consists in the construction and arrangement of a cotton or hay press, as will be hereinafter more fully set forth.

In order to enable others skilled in the art to which my invention appertains to make and use the same, I will now proceed to describe its construction and operation, referring to the annexed drawing, in which—

Figure 1 is a longitudinal vertical section of my press; and Fig. 2 is an end view of the upper follower, showing the connection with the operating-screw.

A represents the frame of my press constructed in any suitable manner, and containing the press-box B, which is provided with two followers, C and D. The lower follower C is at each end provided with a stationary nut, E, through which passes a hollow vertical screw, G, journaled at both ends in suitable bearings attached to the frame A. On the lower end of each hollow screw G is attached a beveled cog-wheel, H, which gears with a pinion, a, upon the driving-shaft b, said shaft being operated by a crank or other suitable convenient power. The upper end of each hollow screw G forms a nut, d, through which is passed a vertical screw, I. The screw-threads on the screws G and I should run in opposite directions, and have the same number of threads to the inch, so that when the hollow screws G are revolved in their bearings, the nuts E and screws I will move in opposite directions at equal speed. Near the upper end of each screw I is pivoted a stirrup, J, which is thrown over the end of the upper follower D, said end being slotted to receive the end of the screw-rod, as shown in Fig. 2. The bale-box is open at top and bottom, and provided with suitable doors in the center. The screws are turned, so as to run the follower C down to the bottom, and the follower D to the top. The latter follower is then lifted out by throwing off the stirrups J J. The hay, cotton, or other material to be pressed is then placed in the bale-box, and when the desired quantity is put in the follower D is placed on top, and connected to the screws I I by the stirrups J J. By now revolving the driving-shaft $b$ in the proper direction the hollow screws G G are revolved, thereby raising the lower follower C, and pulling down the upper follower D, pressing the bale between them. The hay, cotton, or other material being pressed from top and bottom simultaneously, the distance the material travels in the bale-box is lessened, thereby reducing the friction, and by the application of the right and left hand screws both speed and power are gained. As the two pressures counterbalance each other there is very little pressure on the collars $e\ e$ at the lower ends of the hollow screws G.

Having thus fully described my invention, what I claim as new, and desire to secure by Letters Patent, is—

The combination, with the frame A and press-box B, of the upper follower C, hinged stirrups J J, screw-rods I I, lower follower C, nuts E E, and the hollow upright screws G G, the two followers being moved simultaneously toward each other, all constructed and operating substantially as set forth.

In testimony that I claim the foregoing I have hereunto set my hand this 26th day of January, 1875.

BENJAMIN J. WILSON.

Witnesses:
JOHN F. MORRIS,
J. H. GOLDSMITH.